(12) United States Patent
Huotari et al.

(10) Patent No.: US 8,500,188 B2
(45) Date of Patent: Aug. 6, 2013

(54) PLANAR-ZIPPERING CORNERING DESIGN

(75) Inventors: Keijo J. Huotari, Fenton, MI (US); Eric Hanson, Dearborn, MI (US)

(73) Assignee: Magna International, Inc., Aurora, Ontario (CA)

( * ) Notice: Subject to any disclaimer, the term of this patent is extended or adjusted under 35 U.S.C. 154(b) by 182 days.

(21) Appl. No.: 12/931,807

(22) Filed: Feb. 11, 2011

(65) Prior Publication Data

US 2011/0198881 A1 Aug. 18, 2011

Related U.S. Application Data

(60) Provisional application No. 61/337,985, filed on Feb. 12, 2010.

(51) Int. Cl.
*B60J 1/18* (2006.01)
(52) U.S. Cl.
USPC .................................. 296/107.07; 296/146.14
(58) Field of Classification Search
USPC ..................... 296/102, 100.16, 107.07, 136.1, 296/107.12, 107.01, 121, 146.14–146.16, 296/201; 135/88.05, 88.01, 88.09, 117; 150/166, 168, DIG. 2, DIG. 4
See application file for complete search history.

(56) References Cited

U.S. PATENT DOCUMENTS

| | | | | |
|---|---|---|---|---|
| 2,928,127 | A * | 3/1960 | Armstrong | 264/257 |
| 3,096,117 | A * | 7/1963 | Hallenbeck | 296/107.07 |
| 5,271,655 | A * | 12/1993 | Ball et al. | 296/146.14 |
| 5,375,901 | A * | 12/1994 | Agosta et al. | 296/146.14 |
| 5,417,273 | A * | 5/1995 | Bamonte | 160/368.1 |
| 6,712,420 | B1 * | 3/2004 | Kargilis et al. | 296/146.15 |
| 6,817,647 | B1 * | 11/2004 | Green | 296/77.1 |
| 6,979,045 | B1 * | 12/2005 | Evans | 296/107.07 |
| 7,234,754 | B2 * | 6/2007 | Evans | 296/107.07 |
| 2011/0198881 | A1 * | 8/2011 | Huotari et al. | 296/107.07 |

* cited by examiner

*Primary Examiner* — Glenn Dayoan
*Assistant Examiner* — Gregory Blankenship
(74) *Attorney, Agent, or Firm* — Warn Partners, P.C.

(57) ABSTRACT

The present invention is directed to a zipper for use with a foldable, stowable roof for a vehicle, where the foldable roof includes one or more windows made of a foldable material. The zipper also changes from being in a two-dimensional plane to a three-dimensional plane around a curved portion of the window, reducing the stress placed on the portion of the zipper connected to the foldable roof, and the portion of the zipper connected to the window.

20 Claims, 4 Drawing Sheets

PLANAR-ZIPPERING CORNERING DESIGN

CROSS-REFERENCE TO RELATED APPLICATIONS

This application claims priority to U.S. Provisional Application No. 61/337,985 filed on Feb. 12, 2010. The disclosure of the above application is incorporated herein by reference.

FIELD OF THE INVENTION

The present invention relates to a zipper type of fastener used for a foldable, stowable roof, for sport utility vehicles. More specifically, the present invention is directed to a zipper which is suited for selectively connecting two curved portions of a foldable, stowable roof.

BACKGROUND OF THE INVENTION

Foldable stowable roof tops are commonly used in sport-utility vehicles for recreational purposes. The foldable roof is typically moved between a stowed position, and a deployed position. When in the deployed position, the foldable roof protects the occupants of the vehicle from various weather conditions. The foldable roof also includes various sections which are made of a clear material to essentially function as a window, allowing the occupant of the vehicle to see outside of the vehicle. It is also sometimes desirable to open these clear, foldable, window sections when weather conditions are favorable, but the occupant(s) of the vehicle do not desire to change the foldable roof to the stowed position.

Because these window sections are also foldable, typical window crank devices and electric motors used for opening and closing a window made of glass (which is rigid and not foldable) are not suitable for use with a foldable roof. Therefore, other methods of opening the foldable window have been developed. One of these methods is a zipper which is typically one continuous zipper that surrounds all sides of the window but one. The one side of the window which is not surrounded by the zipper is the foldable side, allowing the window to be folded from the closed to the open position.

One of the drawbacks to this type of design is that most zippers are designed for attaching two portions of material along a substantially straight section of each portion of the material. When these types of zippers are used with a foldable window having various curves, the zipper is difficult to use. More specifically, both sides of the zipper are in the same plane, and the portion of the zipper attached to the foldable window has a shorter radius in relation to the portion of the zipper attached to the remaining portion of the foldable roof. The difference between the radius of the outer window connected to the zipper and the radius of the foldable roof connected to the zipper is typically the width of the zipper. This makes the zipper difficult to use around the corners of the window because there is an imbalanced amount of stress placed on the portion of the zipper connected to the window and the portion of the zipper connected to the foldable roof. A typical zipper is designed for connecting two sheets of material along a substantially straight surface.

Accordingly, there exists a need for a zipper which is suitable for providing a selective connection between a foldable roof and a foldable window having various curved areas.

SUMMARY OF THE INVENTION

The present invention is directed to a fastener or zipper for use with a foldable, stowable roof for a vehicle, where the foldable roof includes one or more windows made of a foldable material. The zipper also changes from being in a two-dimensional plane to a three-dimensional plane around a curved portion of the window, reducing the stress placed on the portion of the zipper connected to the foldable roof, and the portion of the zipper connected to the window.

In one embodiment, the present invention is an attachment device used for connecting a foldable, stowable roof and a foldable window for a vehicle. The foldable, stowable roof is connected to a vehicle, and has at least one curved portion and at least one straight portion. Additionally, the foldable window is also connected to the vehicle, and the foldable window has at least one curved portion and at least one straight portion. The curved portion of the foldable, stowable roof corresponds to the shape of the curved portion of the foldable window. The attachment device selectively connects the foldable, stowable roof to the foldable window. The attachment device is disposed in a first plane in the areas of the straight portion of the foldable, stowable roof and the straight portion of the foldable window, and the attachment device is in a second plane in the areas of the curved portion of the foldable, stowable roof and the curved portion of the foldable window.

In one embodiment, the attachment device is a fastener or zipper having a first half connected to the foldable, stowable roof, and a second half connected to the foldable window. The zipper includes a slider operable for selectively connecting and disconnecting the first half to the second half as the slider is moved in a first direction or a second direction.

The zipper includes a first seam connecting the first half of the zipper to the foldable, stowable roof such that a portion of the first half is disposed in the first plane, and a portion of the first half is disposed in the second plane. The zipper also includes a second seam connecting the second half of the zipper to the foldable window such that a portion of the second half is disposed in the first plane, and a portion of the second half is disposed in the second plane. The change in position of the zipper between the first plane and the second plane reduces the amount of stress on the zipper in the curved portions of the foldable, stowable roof and the foldable window.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
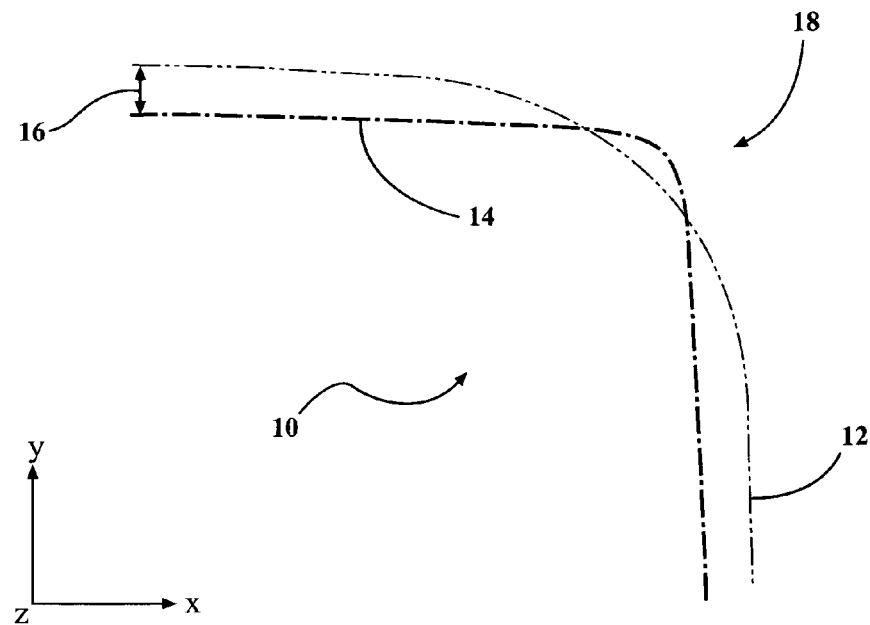
FIG. 1 is a schematic for a zipper design, according to the present invention.
Figure 3:
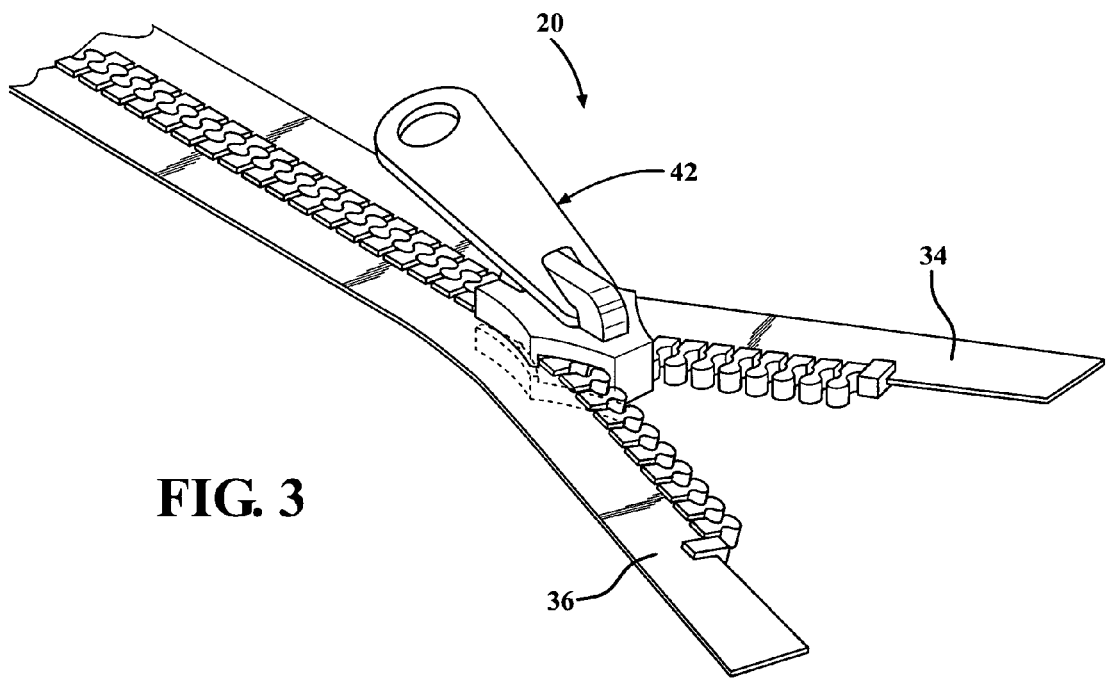
FIG. 3 is a top view of a zipper used for selectively connecting a foldable roof and a foldable window, according to the present invention.
Figure 2:
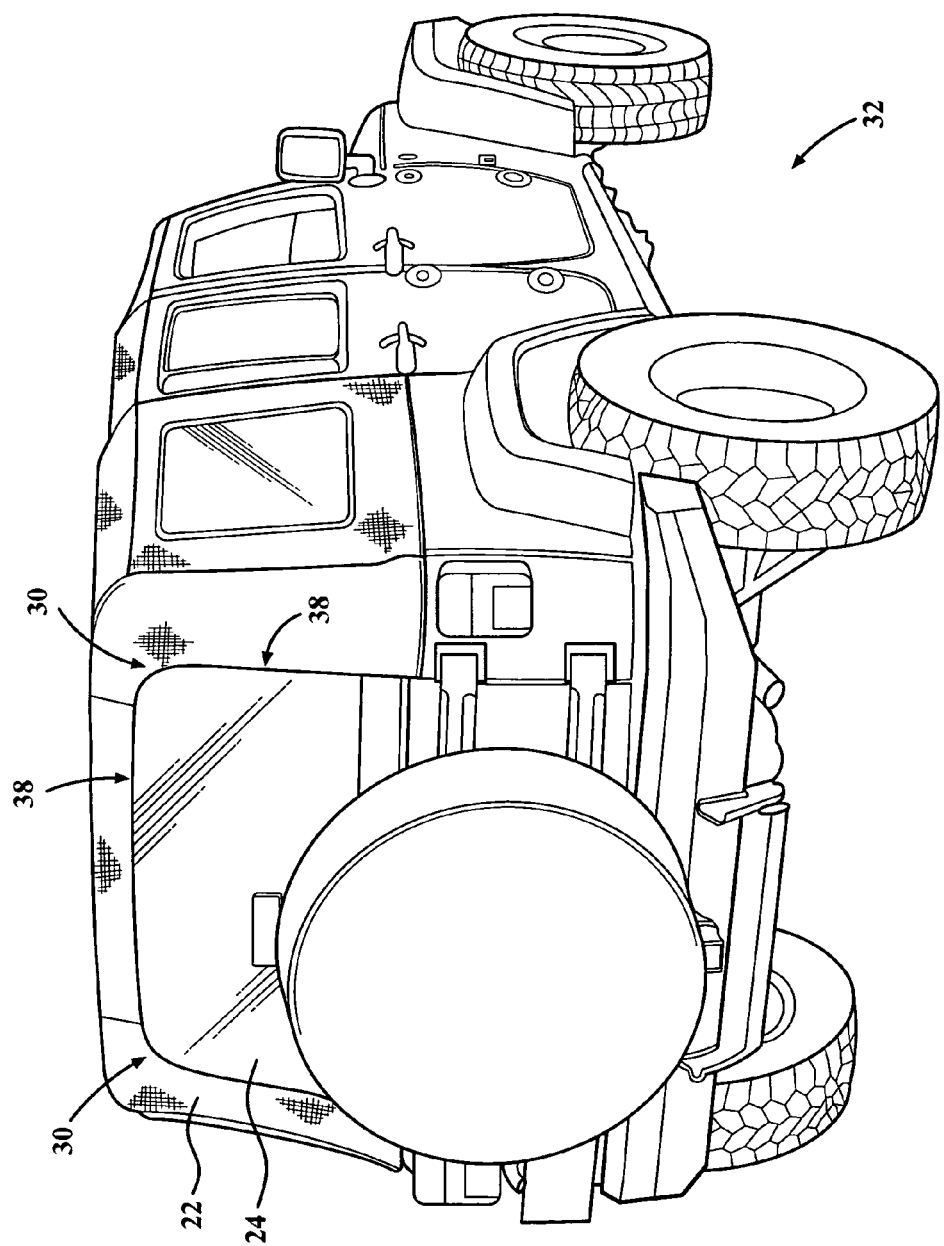
FIG. 2 is a perspective view of a vehicle incorporating a zipper used for selectively connecting a foldable roof and a foldable window, according to the present invention.
Figure 4:
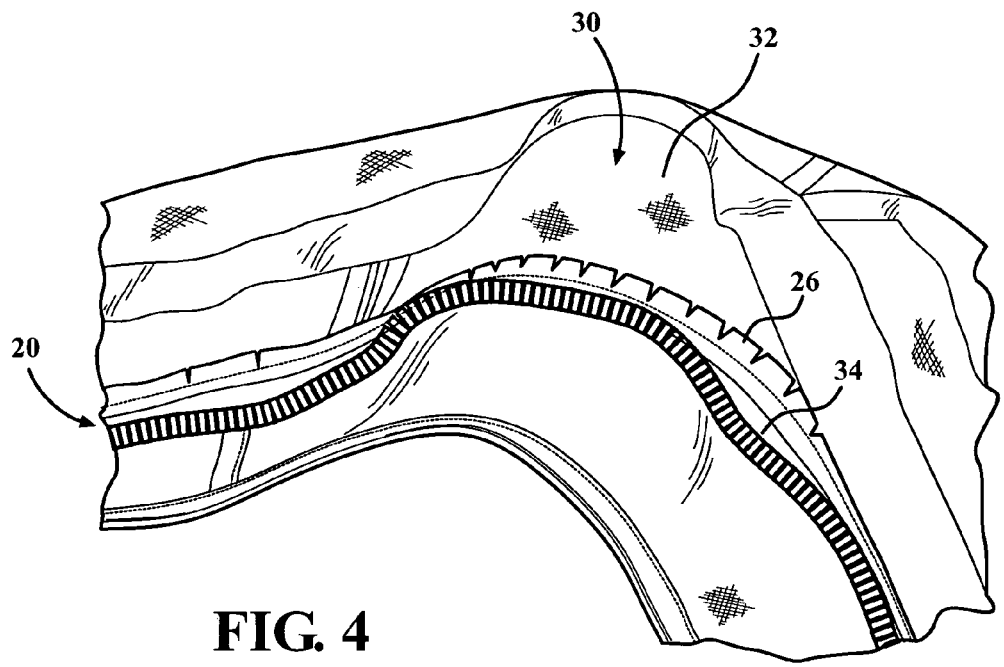
FIG. 4 is a perspective view of a first half of a zipper connected to a foldable roof, which is part of a zipper used for selectively connecting a foldable roof and a foldable window, according to the present invention.
Figure 5:
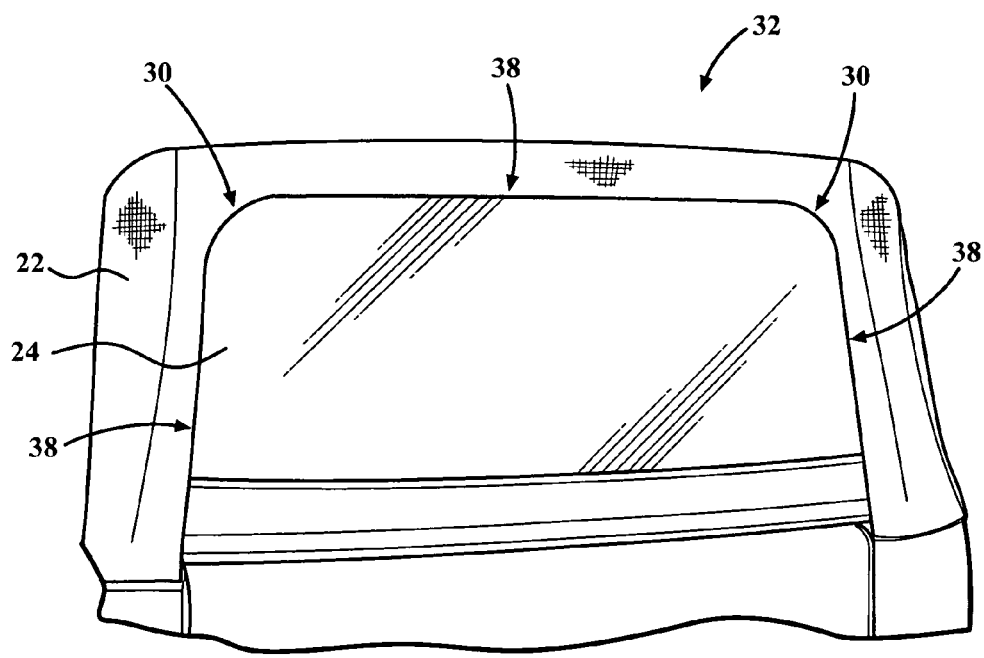
FIG. 5 is an enlarged perspective view of a portion of a vehicle incorporating a zipper used for selectively connecting a foldable roof and a foldable window, according to the present invention.

A schematic of a zipper used for a foldable, stowable roof according to the present invention is shown in FIG. 1, generally at 10. The schematic 10 showing the zipper of the present invention depicts the path of the zipper in a three dimensional plane. There are two lines shown in FIG. 1, the first line 12 represents the connection (or "seam") between the zipper and the corner portion of the foldable roof, the second line 14 represents the connection (also a "seam") between the zipper and a corner portion of a foldable window. The length of the first line 12 and second line 14 is substantially the same. Also, the distance 16 between the first line 12 and the second line 14 is also substantially the same through the entire arc, generally shown at 18, as the zipper is manipulated around a curved area.

Because the length of the lines 12,14 is substantially the same, and the distance 16 between the lines 12,14 is substantially the same, the lines 12,14 change position throughout the length of the arc 18, which represents the change in position of the seams throughout the arc 18. At the portion of the arc 18 which is most pronounced, the two lines 12,14 cross over, representing the area where the zipper moves substantially ninety degrees, and changes from being located in the X-Y plane (essentially a two-dimensional plane), to extending out of the X-Y plane in a direction parallel to the Z-axis (essentially a three-dimensional plane), as shown in FIG. 1.

Referring now to FIGS. 2-7, a zipper, shown generally at 20 is connected to a foldable roof 22 and a foldable window 24. The zipper 20 is connected to the roof 22 by a first seam 26 (represented by the first line 12 in FIG. 1) and is connected to the foldable window 24 through the use of a second seam 28 (represented by the second line 14 in FIG. 1). More specifically, the zipper 20 has a first half 34 connected to the roof 22 by the first seam 26, and a second half 36 connected to the foldable window 24 by the second seam 28.

FIGS. 2-7 show the curved portions, generally shown at 30, of the roof 22 and the window 24, as well as the roof 22 and window 24 attached to a vehicle, generally shown at 32. The zipper 20 lies substantially in a first plane (the X-Y plane) in areas where the roof 22 and the window 24 are not curved, generally shown as straight portions 38, and is repositioned substantially ninety-degrees (extending into a second plane, or a direction parallel to the Z-axis) in the areas of the curved portions 30 of the roof 22 and window 24, best seen in FIGS. 6-7.

When it is desired to open or close the window 24, the slider, generally shown at 42, of the zipper 20 is moved in a first direction or a second direction such that the halves 34,36 of the zipper 20 are either connected or separated, depending upon whether the window 24 is being closed or opened. In either case, as the slider 42 is moved towards one of the curved portions 30, both halves 34,36 of the zipper 20 rotate about ninety-degrees, best shown in FIGS. 1, 6, and 7. The halves 34,36 of the zipper 20 change from being located in the X-Y plane, to extending in a direction parallel to the Z-axis, best shown in FIG. 1. Essentially, the halves 34,36 are perpendicular to the foldable roof 22 and the foldable window 24 along the curved portions 30.

Figure 6:
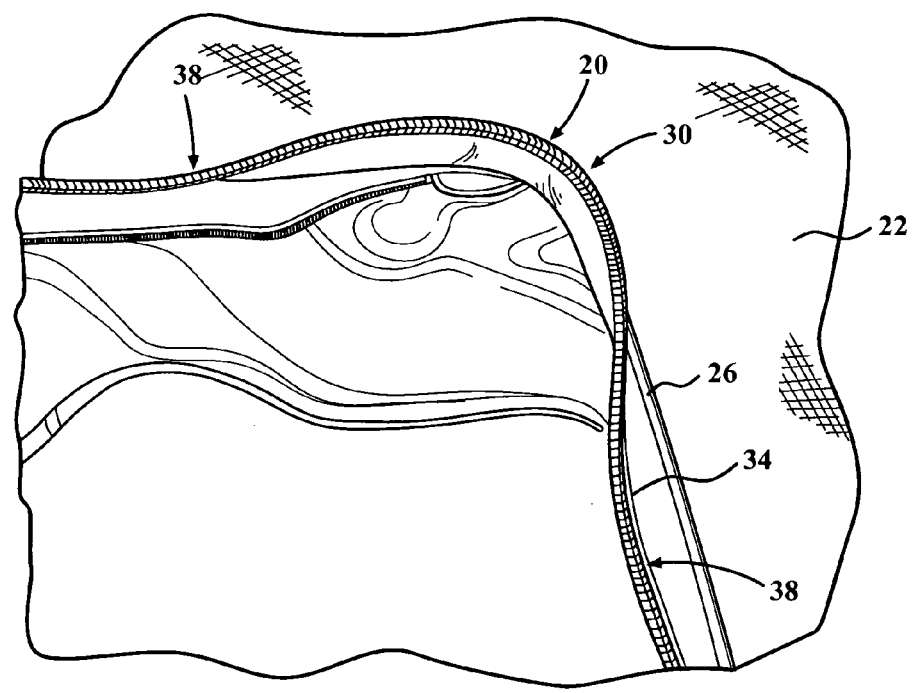
FIG. 6 is a second perspective view of a first half of a zipper connected to a foldable roof, which is part of a zipper used for selectively connecting a foldable roof and a foldable window, according to the present invention.
Figure 7:
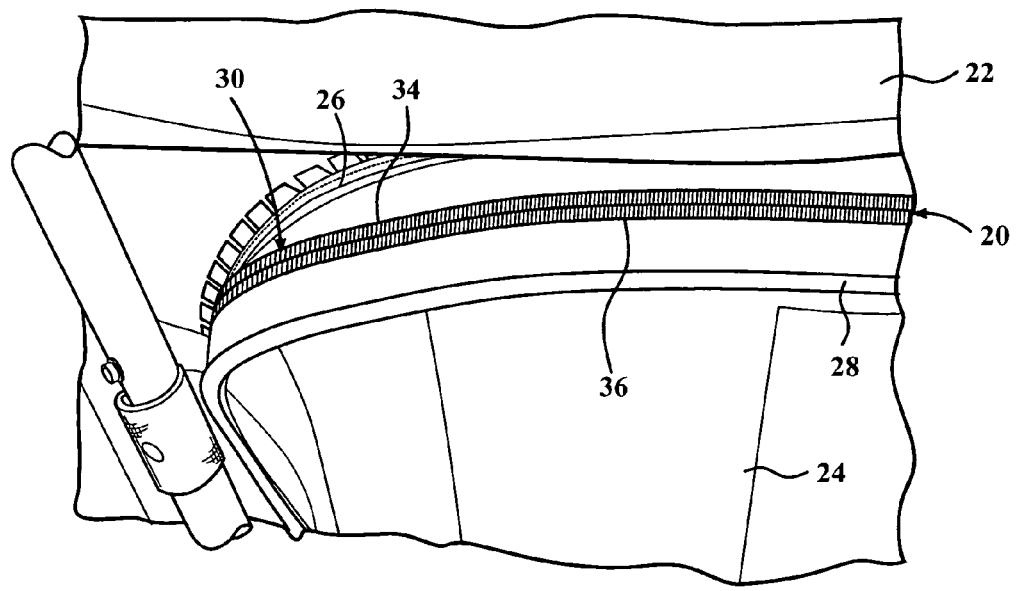
FIG. 7 is a greatly enlarged perspective view of a foldable roof incorporating a zipper used for selectively connecting a foldable roof and a foldable window, according to the present invention.

To facilitate the repositioning of the halves 34,36 of the zipper 20, the first half 34 of the zipper 20 is attached to the roof 22 such that the portion of the half 34 connected along the straight portions 38 is stitched such that the first seam 26 positions the first half 34 of the zipper 20 to lay flat, in the X-Y plane, best shown in FIGS. 1 and 6. The first half 34 of the zipper 20 connected along the curved portions 30 is stitched such that the first seam 26 positions the first half 34 of the zipper 20 to extend substantially perpendicularly to the foldable roof 22 (along the Z-axis), best shown in FIGS. 6-7. The second half 36 of the zipper 20 is attached to the foldable window 24 such that the portion of the second half 36 connected to the window 24 along the straight portions 38 is stitched such that the second seam 28 positions the second half 36 of the zipper 20 to lay flat, in the X-Y plane, shown schematically in FIG. 1. The second half 36 of the zipper 20 connected along the curved portions 30 is stitched along the curved portions 30 such that the second seam 28 positions the second half 36 of the zipper 20 to extend substantially perpendicularly away from the foldable window 24 (along the Z-axis), as shown in FIGS. 6-7.

The zipper 20 having the cornering design of the present invention facilitates the opening and closing of the foldable window 24, without placing an imbalanced amount of stress of the zipper 20. While it has been described in the present invention that the zipper 20 rotates to an angle of substantially ninety degrees, the rotation of the zipper 20 provides a reduction in stress on the zipper 20, the window 24, and roof 22 when the zipper 20 is positioned in a range of generally about forty-five degrees to about one-hundred eighty degrees, typically from about sixty degrees to about one-hundred twenty degrees, and preferably about ninety degrees. Therefore, there is a benefit to the positioning of the zipper 20 at angles other than ninety degrees.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An attachment device used for connecting a foldable, stowable roof and a foldable window for a vehicle, comprising:
   a foldable roof connected to said vehicle, said foldable roof having at least one curved portion and at least one straight portion;
   a foldable window connected to said vehicle, said foldable window having at least one curved portion and at least one straight portion, said at least one curved portion of said foldable roof corresponding to the shape of said at least one curved portion of said foldable window; and
   a fastener for selectively connecting said foldable roof to said foldable window, wherein said fastener is disposed in a first plane that is an X-Y two-dimensional plane in the areas of said at least one straight portion of said foldable roof and said at least one straight portion of said foldable window, and said fastener is in a second plane that is parallel to a Z-axis in the areas of said at least one curved portion of said foldable roof and said at least one curved portion of said foldable window.

2. The attachment device used for connecting a foldable, stowable roof and a foldable window for a vehicle of claim 1, said fastener further comprising a zipper.

3. The attachment device used for connecting foldable, stowable roof and a foldable window for a vehicle of claim 2, said zipper further comprising:
a first half connected to said foldable roof;
a second half connected to said foldable window; and
a slider operable for selectively connecting and disconnecting said first half to said second half as said slider is moved in a first direction or a second direction.

4. The attachment device used for connecting a foldable, stowable roof and a foldable window for a vehicle of claim 3, said zipper further comprising a first seam, and said first half of said zipper is connected to said foldable roof with said first seam.

5. The attachment device used for connecting a foldable, stowable roof and a foldable window for a vehicle of claim 4, said first seam connecting said first half of said zipper to said foldable roof such that a portion of said first half is disposed in said first plane, and a portion of said first half is disposed in said second plane.

6. The attachment device used for connecting a foldable, stowable roof and a foldable window for a vehicle of claim 3, said zipper further comprising a second seam, said second half of said zipper is connected to said foldable window with said second seam.

7. The attachment device used for connecting a foldable, stowable roof and a foldable window for a vehicle of claim 6, said second seam connecting said second half of said zipper to said foldable window such that a portion of said second half is disposed in said first plane, and a portion of said second half is disposed in said second plane.

8. The attachment device used for connecting a foldable, stowable roof and a foldable window for a vehicle of claim 1, wherein said fastener is positioned at an angle relative to said foldable window and said foldable roof when said fastener is in said second plane.

9. The attachment device used for connecting a foldable, stowable roof and a foldable window for a vehicle of claim 8, wherein said angle is about ninety degrees.

10. The attachment device used for connecting a foldable, stowable roof and a foldable window for a vehicle of claim 8, wherein said angle is generally between about forty-five degrees to about one-hundred eighty degrees.

11. The attachment device used for connecting a foldable, stowable roof and a foldable window for a vehicle of claim 8, wherein said angle is generally between about sixty degrees to about one-hundred twenty degrees.

12. A zipper used for connecting a foldable, stowable roof and a foldable window for a vehicle, comprising:
a first half connected to a foldable roof such that a portion of said first half is positioned in a first plane, and a portion of said first half is positioned in a second plane;
a second half connected to said foldable window such that a portion of said second half is positioned in said first plane, and a portion of said second half is positioned in said second plane; and
a slider used for selectively connecting and disconnecting said first half to said second half as said slider is moved in a first direction or a second direction;
wherein said first half of said zipper and said second half of said zipper are located in said first plane that is an X-Y two-dimensional plane along a straight portion of said foldable window and a straight portion of said foldable roof, and said first half of said zipper and said second half of said zipper are located in said second plane that is parallel to a Z-axis along a curved portion of said foldable window and a curved portion of said foldable, stowable roof when said first half is connected to said second half.

13. The attachment device used for connecting a foldable, stowable roof and a foldable window for a vehicle of claim 12, wherein said zipper is positioned relative to said foldable window and said foldable, stowable roof at an angle of about ninety degrees.

14. The zipper used for connecting a foldable, stowable roof and a foldable window for a vehicle of claim 12, wherein said first half is connected to said foldable, stowable roof by a first seam such that a portion of said first half of said zipper is disposed in said first plane, and a portion of said first half of said zipper is disposed in said second plane.

15. The zipper used for connecting a foldable, stowable roof and a foldable window for a vehicle of claim 12, wherein said second half is connected to said foldable window by a second seam such that a portion of said second half of said zipper is disposed in said first plane, and a portion of said second half of said zipper is disposed in said second plane.

16. The attachment device used for connecting a foldable, stowable roof and a foldable window for a vehicle of claim 12, wherein said zipper is positioned relative to said foldable window and said foldable, stowable roof at an angle between about sixty degrees to about one-hundred twenty degrees.

17. An attachment device used for selectively connecting a foldable, stowable roof and a foldable window for a vehicle, comprising:
a foldable, stowable roof;
a foldable window;
a zipper having a first half connected to foldable, stowable roof, and a second half connected to said foldable window, and a slider connected to both of said first half and said second half;
a first seam connecting said first half of said zipper to said foldable, stowable roof such that a portion of said first seam is disposed in a first plane that is an X-Y two-dimensional plane along a straight portion of said foldable, stowable roof and said foldable window, and a portion of said first seam is disposed in a second plane that is parallel to a Z-axis along a curved portion of said foldable, stowable roof and said foldable window; and
a second seam connecting said second half of said zipper to said foldable window such that a portion of said second seam is disposed in said first plane along a straight portion of said foldable, stowable roof and said foldable window, and a portion of said second seam is disposed in said second plane along a curved portion of said foldable, stowable roof and said foldable window;
wherein as said slider is moved in a first direction or a second direction, said first half of said zipper is selectively connected or disconnected from said second half of said zipper.

18. The attachment device used for connecting a foldable, stowable roof and a foldable window for a vehicle of claim 17, wherein the zipper is about ninety degrees relative to said foldable window and said foldable, stowable roof.

19. The attachment device used for connecting a foldable, stowable roof and a foldable window for a vehicle of claim 17, wherein the zipper is between about forty-five degrees to about one-hundred eight degrees relative to said foldable window and said foldable, stowable roof.

20. The attachment device used for connecting a foldable, stowable roof and a foldable window for a vehicle of claim 17, wherein the zipper is between about sixty degrees to about one-hundred twenty degrees relative to said foldable window and said foldable, stowable roof.

* * * * *

UNITED STATES PATENT AND TRADEMARK OFFICE
CERTIFICATE OF CORRECTION

| | | |
|---|---|---|
| PATENT NO. | : 8,500,188 B2 | Page 1 of 1 |
| APPLICATION NO. | : 12/931807 | |
| DATED | : August 6, 2013 | |
| INVENTOR(S) | : Keijo J. Huotari and Eric Hanson | |

It is certified that error appears in the above-identified patent and that said Letters Patent is hereby corrected as shown below:

In the Claims

Column 6, Line 64, Claim 19 "eight" should be -- eighty --

Signed and Sealed this
Second Day of September, 2014

Michelle K. Lee
*Deputy Director of the United States Patent and Trademark Office*